United States Patent
Hynes et al.

(10) Patent No.: US 7,677,462 B2
(45) Date of Patent: Mar. 16, 2010

(54) METHOD OF REDUCING ELECTRO-STATIC DISCHARGE (ESD) FROM CONDUCTORS ON INSULATORS

(75) Inventors: John Hynes, Reisterstown, MD (US); John Kawand, Titusville, NJ (US); Lily O'Boyle, Cream Ridge, NJ (US); Sundar Sadasivan, Plainsboro, NJ (US); Leonardo Vincitore, Yonkers, NY (US); Salvatore F. D'Amato, Mocksville, NC (US)

(73) Assignee: JDS Uniphase Corporation, Milpitas, CA (US)

( * ) Notice: Subject to any disclaimer, the term of this patent is extended or adjusted under 35 U.S.C. 154(b) by 290 days.

(21) Appl. No.: 11/484,984

(22) Filed: Jul. 11, 2006

(65) Prior Publication Data

US 2007/0201174 A1    Aug. 30, 2007

Related U.S. Application Data

(60) Provisional application No. 60/776,717, filed on Feb. 24, 2006, provisional application No. 60/776,720, filed on Feb. 24, 2006, provisional application No. 60/776,718, filed on Feb. 24, 2006.

(51) Int. Cl.
*G06K 19/06* (2006.01)
(52) U.S. Cl. .................. 235/492; 235/487; 235/493; 359/5
(58) Field of Classification Search ............. 235/492, 235/493, 487; 359/2, 5
See application file for complete search history.

(56) References Cited

U.S. PATENT DOCUMENTS 3,888,678 A    6/1975    Bailey, Jr. et al.
4,392,177 A    7/1983    Geyken
4,591,945 A    5/1986    Ugon
4,756,414 A    7/1988    Mott
4,761,543 A    8/1988    Hayden
4,796,153 A    1/1989    Amason et al.
4,852,911 A  * 8/1989    Hoppe .................. 283/82
4,906,494 A    3/1990    Babinec et al.
4,949,155 A    8/1990    Tajima et al.
5,028,490 A    7/1991    Koskenmaki et al.
5,068,061 A    11/1991   Knobel et al.
5,110,669 A    5/1992    Knobel et al.
5,336,871 A  * 8/1994    Colgate, Jr. ............. 235/380
5,368,913 A    11/1994   Ortega
5,432,329 A  * 7/1995    Colgate et al. ........... 235/487

(Continued)

FOREIGN PATENT DOCUMENTS

JP    63 308740    12/1988

OTHER PUBLICATIONS

EP06786942; Supplementary European Search Report dated Mar. 16, 2009.

*Primary Examiner*—Daniel A Hess
*Assistant Examiner*—Rafferty Kelly
(74) *Attorney, Agent, or Firm*—Matthew A. Pequignot; Pequignot + Myers LLC

(57) ABSTRACT

A non-conductive carrier having a conductive component comprising a plurality of sections to disrupt the conductive component's conductive path. Each section is isolated from other sections such that a charge accumulated in one section cannot combine with the charge accumulated in another section, thereby minimizing any potential electrostatic discharge from the carrier.

21 Claims, 16 Drawing Sheets

U.S. PATENT DOCUMENTS

| | | | |
|---|---|---|---|
| 5,525,423 A | 6/1996 | Liberman et al. | |
| 5,558,977 A | 9/1996 | DePalma et al. | |
| 5,736,469 A | 4/1998 | Bhattacharjee et al. | |
| 5,754,110 A | 5/1998 | Appalucci et al. | |
| 5,757,521 A * | 5/1998 | Walters et al. | 359/2 |
| 5,759,649 A | 6/1998 | Dinter et al. | |
| 5,841,350 A | 11/1998 | Appalucci et al. | |
| 5,949,060 A * | 9/1999 | Schattschneider et al. | 235/492 |
| 5,989,696 A | 11/1999 | McCarthy et al. | |
| 6,143,405 A | 11/2000 | Palmgren | |
| 6,147,302 A | 11/2000 | Matsuo et al. | |
| 6,235,660 B1 | 5/2001 | Bhattacharjee et al. | |
| 6,255,948 B1 * | 7/2001 | Wolpert et al. | 340/572.8 |
| 6,410,847 B1 | 6/2002 | Allen et al. | |
| 6,456,466 B1 | 9/2002 | Nakamoto et al. | |
| 6,506,972 B1 | 1/2003 | Wang | |
| 6,685,989 B2 | 2/2004 | Bhattacharjee et al. | |
| 6,817,689 B1 | 11/2004 | Annacona | |
| 6,930,242 B1 | 8/2005 | Helfer et al. | |
| 7,012,796 B2 | 3/2006 | Chen et al. | |
| 7,225,994 B2 * | 6/2007 | Finkelstein | 235/493 |
| 2002/0130186 A1 * | 9/2002 | Lasch et al. | 235/488 |
| 2005/0064152 A1 | 3/2005 | Aylward et al. | |
| 2005/0064154 A1 | 3/2005 | Aylward et al. | |
| 2005/0069683 A1 | 3/2005 | Aylward et al. | |
| 2005/0247472 A1 | 11/2005 | Helfer et al. | |
| 2006/0017571 A1 | 1/2006 | Arnold et al. | |
| 2006/0283958 A1 * | 12/2006 | Osterweil | 235/492 |

* cited by examiner (Section A-A on Fig. 2A)

Section "AA" on Fig. 5A

Section "AA" on Fig. 5A

METHOD OF REDUCING ELECTRO-STATIC DISCHARGE (ESD) FROM CONDUCTORS ON INSULATORS

RELATED APPLICATION

This application claims priority benefit of provisional application Ser. Nos. 60/776,717, 60/776,720 and 60/776,718, all filed Feb. 24, 2006, each of which is incorporated by reference in its entirety.

BACKGROUND OF THE INVENTION

Electrostatic charge can be built up and held on an insulator by many methods. A common method is by triboelectric generation of the charge by moving two different materials in contact with each other. As shown in FIG. 1, opposite charges (Positive + and Negative − charges) can build up on each material depending upon their ability to donate or capture electrons that are freed up due to the frictional forces generated during the movement of one material against the other. The charge that builds up on either material is called a static charge (not moving) or electro static charge. It remains on the material for some period of time depending upon the environment with which the material is in contact during the charge holding period. If the insulator holding the charge comes into contact with a conducting material the stored electro static charge can induce a charge in the conductor that can be discharged by the conductor and eventually conducted to ground.

The process of discharging the stored electrical charge is called electrostatic discharge (ESD). When an insulator carries or contains a metal conductor, the stored electrical charge on the insulator induces an equal and opposite charge on the conductor. The induced charges and/or directly deposited charges in the conductor can be conducted through the conductor into another body or to ground. If the charged insulator, containing the conductor, is inserted into or passed close to an electronic device these induced charges in the conductor can transfer into or onto the electronic device and cause disruption of the functions of the electronic device or nearby electronic devices.

The electrostatic discharge into an electronic device can occur in a variety of ways, for example, when a compact disk (CD) is inserted into a computer, a key is inserted into an electronic lock, or a plastic card containing a conducting component into a Point-of-Sale (POS) terminal. The amount of disruptions (i.e., functional disruptions) caused by the ESD within the electronic device depends on how the electrical energy from such ESD is handled by the electronic device. In many cases, the manufacturer of the electronic device takes potential ESD into consideration and designs the electronic device so that ESD will not actually or potentially disrupt the operation of the electronic device. However, there are electronic devices that require a direct insertion of an insulator carrying a conductive component directly into the device (such as a CD) as part of the functionality of the device. In such cases, the ESD can find its way into the sensitive components of the electronic device. Manufacturers use special circuit design and grounding techniques to channel the ESD energy away from sensitive components of the electronic device. However, certain electronic devices in the marketplace are not adequately designed to effectively deal with the ESD and have low tolerance to ESD. If the ESD energy is not channeled properly, then it can disrupt the operation of the electronic device.

Therefore, the present invention proceeds upon the desirability of eliminating or reducing the amount of ESD energy that an insulator carrying a conductive component can discharge into an electronic device, thereby minimizing or preventing any operational or functional disruption of the electronic device.

SUMMARY OF THE INVENTION

It is an object of the present invention to eliminate or reduce the amount of electrostatic charge carried or stored on a conductive component of an insulating device that interfaces with electronic devices, persons or objects.

Another object of the present invention is to fragment the conductive component(s) of an insulating device such that the amount of electrostatic charges stored on and the conduction of the electrostatic charge stored on the conductive component is blocked or greatly reduced from discharging into an electronic device or any other discharge path.

In accordance with an embodiment of the present invention, the resistance of the conductive (or metal) layer on the non-conductive carrier is increased by disrupting the conductivity path. Physical breaks are introduced in the conductive layer by removing portions of the conductive layer or by selective application of a conductive layer.

In accordance with an embodiment of the present invention, a non-conductive carrier comprises a conductive component that is fragmented into a plurality of sections to disrupt the conductive component's conductive path. Each section is isolated from other sections so as to minimize a charge accumulated in one section from combining with the charge accumulated in another section, thereby minimizing any potential electrostatic discharge. Alternatively, each section is isolated from other sections Such that a charge accumulated in one section cannot combine with the charge accumulated in another section, thereby minimizing any potential electrostatic discharge from the conductive component of the carrier.

In accordance with an embodiment of the present invention, a method of reducing electrostatic discharge from a conductive layer on a non-conductive carrier comprises the steps of fragmenting the conductive layer into a plurality of sections to disrupt the conductive layer's conductive path; and isolating each section from other sections such that a charge accumulated in one section cannot combine with the charge accumulated in another section, thereby minimizing any potential electrostatic discharge from the conductive component of the carrier. Alternatively, each section being isolated from other sections so as to minimize a charge accumulated in one section from combining with the charge accumulated in another section, thereby minimizing any potential electrostatic discharge.

In accordance with an embodiment of the present invention, a method of reducing electrostatic discharge from a conductive layer on a non-conductive carrier comprises the steps of forming a fragmented conductive layer comprising a plurality of sections to disrupt the conductive layer's conductive path; and isolating each section from other sections such that a charge accumulated in one section cannot combine with the charge accumulated in another section, thereby minimizing any potential electrostatic discharge from the metal component of the carrier. Alternatively, each section being isolated from other sections so as to minimize a charge accumulated in one section from combining with the charge accumulated in another section, thereby minimizing any potential electrostatic discharge.

In accordance with an embodiment of the present invention, a metalized article is divided into a plurality of sections to disrupt the metalized article's conductive path. Each section being isolated from other sections so as to minimize a charge accumulated in one section from combining with the charge accumulated in another section, thereby minimizing any potential electrostatic discharge. Preferably, the metalized article comprises a non-conducting backing support, which is an integral part of the metalized article.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENTS

Figure 1:
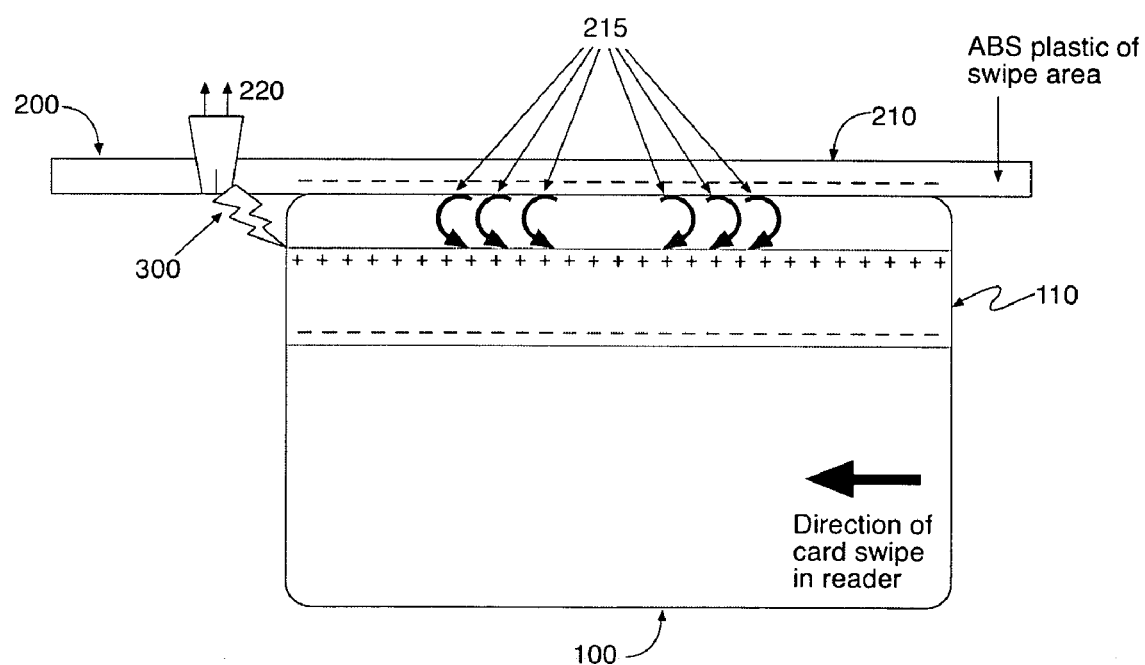
FIG. 1 is a schematic diagram of the triboelectric charges generated on an exemplary conductive layer on a non-conductive carrier, such as a metalized/conductive magnetic stripe on a PVC card, when the card is swiped in the reader.

There are many examples of insulator devices that carry conducting components that can be charged and then discharged into an electronic device. The inventive method is applicable to reduce or eliminate ESD from a conductive component 110 on an insulator 100. Turning now to FIG. 1, the inventive method is described as applied to a polyvinyl chloride (PVC) plastic card (insulator) 100 with a metal conductive coated magnetic stripe (metal component) 110 to reduce or eliminate ESD from a metal component 110 on an insulator 100. A PVC plastic card 100 carrying a metalized magnetic stripe ("mag stripe") 110 is inserted into a magnetic stripe card reader 200, such as a point of sale (POS) terminal 200, where ESD 300 from the metalized magnetic stripe 110 into the POS terminal 200 can disrupt the operation of the POS terminal 200. The following descriptions describe how a conductor or conductive layer 110 on a non-conducting carrier 100 can hold charge that can disrupt electronic devices 200 if the charged conductor 110 and non-conductor carrier 100 are inserted or placed in contact with an electronic device 200.

Plastic cards 100, such as credit cards, automatic teller machine (ATM) cards, charge cards, transit cards, phone cards, stored-value cards, gift cards and debit cards, are typically made from PVC plastics, which can be triboelectric. The triboelectric property of the PVC produces an electrical charge when rubbed against another plastic such as acrylonitrile butadiene styrene (ABS). Magnetic swipe readers (MSR) 210 in the POS terminals 200 are often made from ABS plastic. When the PVC card 100 is swiped in the MSR 210, a triboelectric charge can develop between the ABS and the PVC card 100. The PVC card 100 is left with a positive or negative charge and the body of the MSR is left with an equal and opposite positive or negative charge. An example of such build up of the triboelectric charges from the frictional force of swiping the card 100 is shown in FIG. 1, where negative triboelectric charges build up in the ABS plastic of the magnetic swipe area of the MSR 210. The electric field lines 215 generated by the triboelectric charges on the magnetic swipe area of the MSR 210 induce a positive charge at the top edge of the metalized magnetic stripe 110 and an opposite negative charge on the bottom edge of the metalized magnetic stripe 110.

The electrical charge developed on the card 100, as it moves through the MSR 210, can reach voltages in excess of 1,000 to 3,000 volts over the 14.3 square inch surface area (front and back surface area of card) of the standard ISO specification plastic card. This has been shown to have a total charge on the card 100 of upwards to 2-3 nano coulombs which translates to a capacitance of 1-3 Pico farads on the PVC card 100. The PVC card 100 and metalized magnetic stripe 110 acts like a capacitor and can discharge that stored charge into a low impedance current drain to ground when given an opportunity. Such opportunity can occur when the metalized magnetic stripe 110 of the PVC card 100 encounters the metal magnetic read head 220 in the MSR 210, as shown in FIG. 1.

The metal read head 220 consists of a metal case and a metal core that can capture the magnetic flux emanating from the encoded magnetic stripe 110 and can convert that captured magnetic flux into electrical pulses. When the time varying magnetic flux from the magnetic stripe 110 reaches the read coil of the metal core of the read head 220, the magnetic flux changes are converted into electrical signals by the read coil, which can be decoded by the solid state chips in the read circuits of the MSR 210 or mother board of the POS terminal 200.

If the metal read head 220 encounters an electrically charged PVC card 100, the electrical charges on the metalized magnetic stripe 110 of the card 100 can discharge from the metalized magnetic stripe 110 into the metal read head 220 of the POS terminal 200. This can disrupt the function of the POS terminal 200 if the POS terminal 200 has low tolerance to ESD. The electrical charges then can find their way to ground or to various electronic components, such as solid state chips, of the POS terminal 200. The conduction of the stored electrical charge off the conductive layer or metalized magnetic stripe 110 is a function of the resistivity of the conductive layer or magnetic stripe 110 of the PVC card 100. The electrical charge on the metalized magnetic stripe 110 will generally flow off the metalized magnetic stripe 110 and into the read head 220. The triboelectric charges generated and stored on the card 100 as the card 100 is swiped along the ABS of the MSR 210 can discharge into the magnetic read head 220 of the MSR 210 when the magnetic stripe 110 comes in contact with the metal read head 220 of the POS terminal 200. The MSR 210 and decode electronic circuits in POS terminals 200 are typically designed to deal with such discharge of the electric charges generated by the triboelectric movement of the card 100 through the MSR 210 and stored on the card 100. However, certain POS terminals 200 in the marketplace are not adequately designed to effectively deal with the ESD (i.e., low tolerance to ESD) from the metalized magnetic stripe 110. Accordingly, in accordance with an exemplary embodiment of the present invention, the insulator 100 carries a discontinuous metal component 110 (or metal component 110 with physical breaks therein) to reduce the accumulation of electric charges therein, thereby reducing any potential ESD. That is, for example, the PVC card 100 has discontinuous metalized layer over the magnetic stripe 110 to accommodate existing POS terminals 200 with low tolerance to ESD. Therefore, the present invention proceeds upon the desirability of eliminating or reducing the amount of ESD energy that an insulator or non-conductive carrier 100 carrying a metal or conductive component 110 can discharge into an electronic device 200 by dividing the conductive component 110 into multiple sections. This advantageously minimizes or prevents operational or functional disruption of the electronic device 200 due to ESD.

Figure 2B:
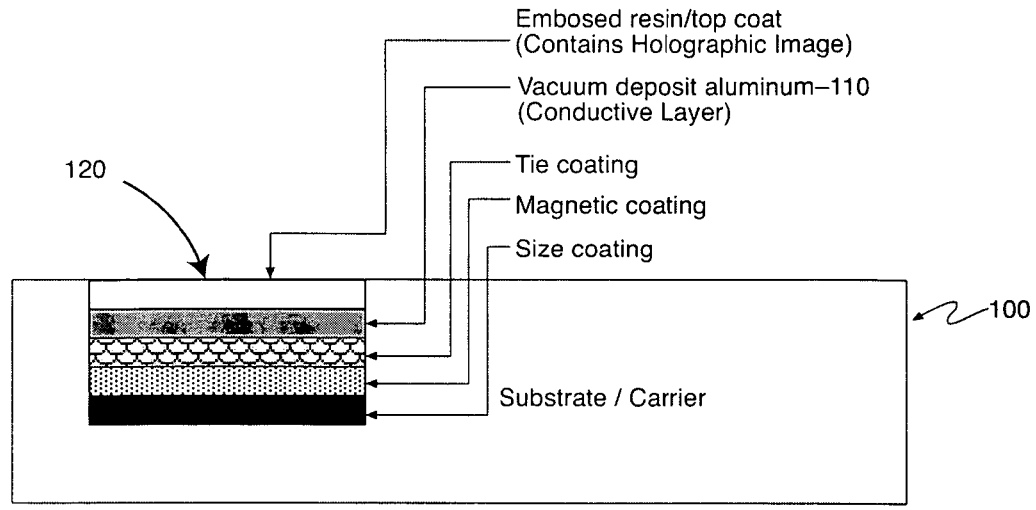
FIGS. 2A-B are schematic diagrams of the holographic magnetic stripe on a substrate, such as a non-conductive/insulator PVC card, in accordance with an exemplary embodiment of the present invention.
Figure 2A:
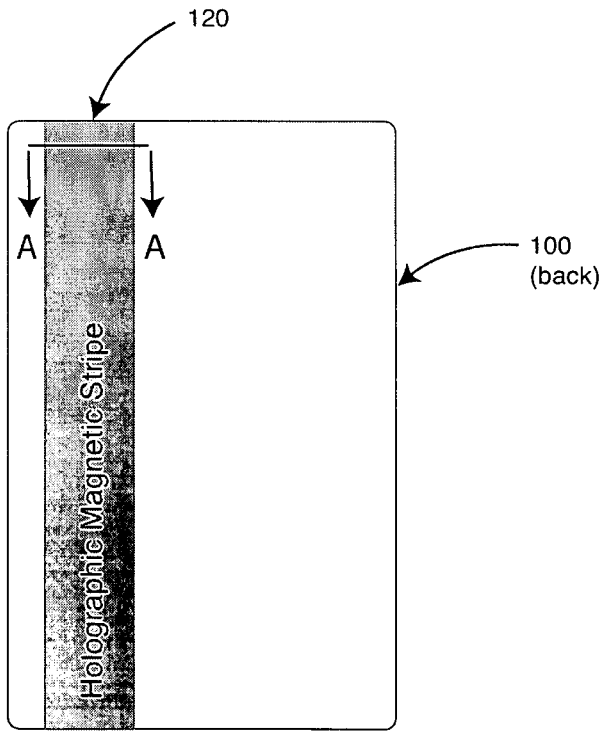
Figure 3:
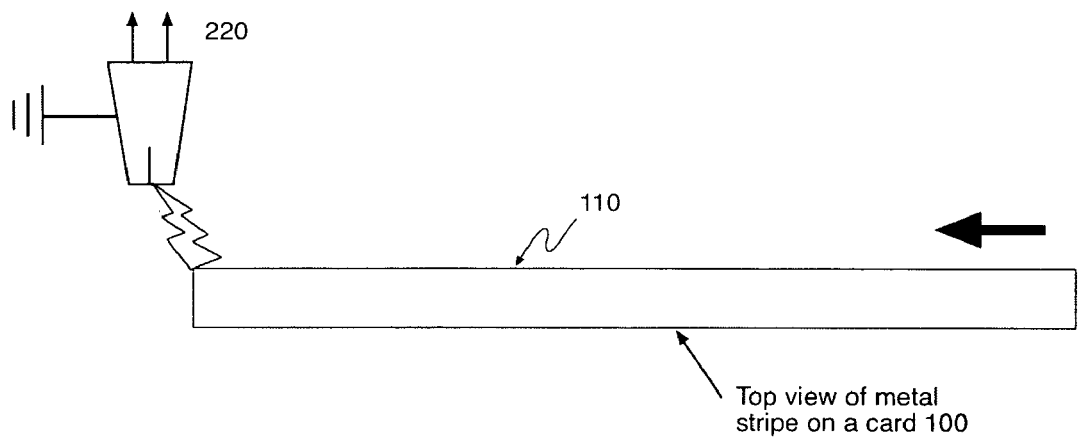
FIG. 3 is a schematic diagram showing an exemplary electrostatic discharge from the exemplary conductive layer on a non-conductive carrier to an electronic device.

An example of a metal coated or metalized magnetic stripe 110 on PVC cards 100 is a holographic magnetic stripe 120, as shown in FIG. 2A. A cross-sectional view of an exemplary holographic stripe 120 is shown in FIG. 2B. The holographic magnetic stripe 120 comprises a conductive metal portion (e.g., vacuum deposited aluminum, copper, aluminum/chrome alloys, etc.) that provides the reflective condition necessary to view the holographic image in the holographic magnetic stripe 120. The metallic portion of the magnetic stripe 110 typically has resistance values ranging from 50 ohms to several thousand ohms. The resistance of the metallic portion of the magnetic stripe 110 is typically low enough to provide a conductive path for the triboelectric charges on the card 100 to discharge through the magnetic read head 220 and into the electronics or the ground path of the POS terminal 200, as shown in FIG. 3.

Figure 4:
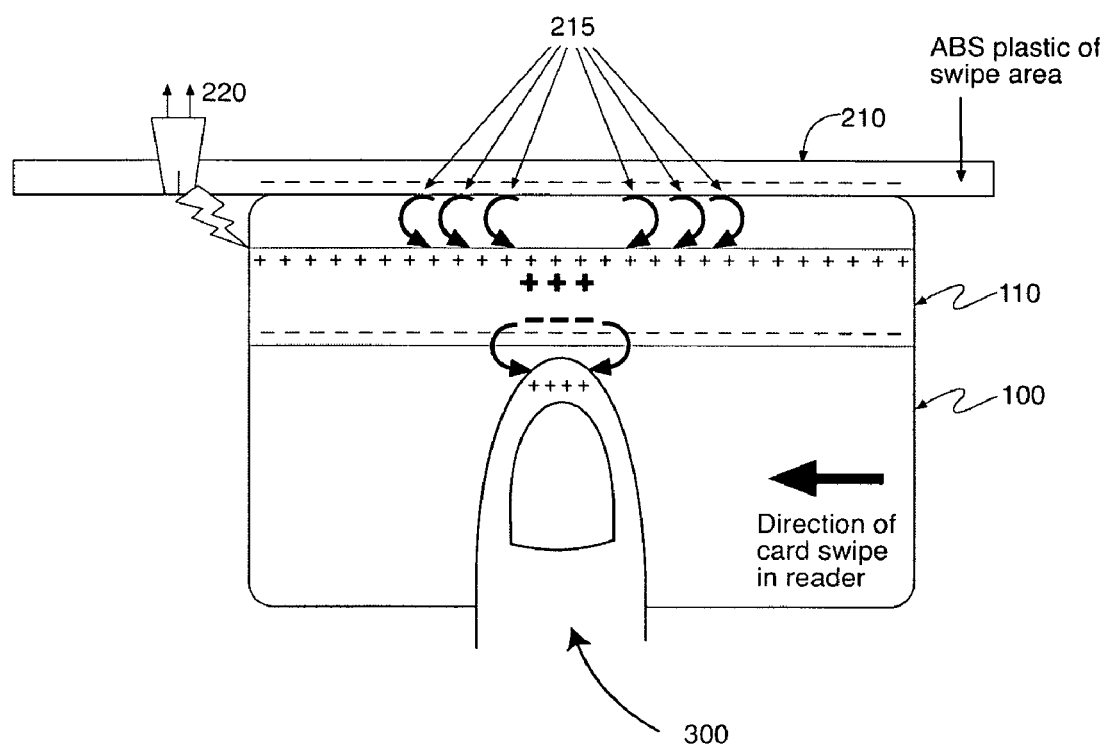
FIG. 4 is a schematic diagram showing an exemplary generation of additional triboelectric charges on the exemplary conductive layer on a non-conductive carrier from the human finger holding the card.

The stored electrostatic charges on the insulator or card 100 and the metallic magnetic stripe 110, which can result in the ESD into the read head 220, can come from several sources. The rubbing action of the card 100 against the surfaces of the magnetic stripe reader 210 can generate the triboelectric charges. Typically, the major area of the magnetic stripe reader 210 comprises ABS plastic, as shown in FIG. 1. The human body is another source of triboelectric charges. The human body can generate the triboelectric charges from various frictional forces, such as from walking, removing card from the wallet, etc. An example of such triboelectric charges from the human body is shown in FIG. 4, wherein the human finger 300 is positively charged by the frictional forces generated from the movement of body as it moves across a carpet for example and as it holds the card 100 during the swipe. The electric field from the positive charges on the finger induces more negative and positive charges on the metalized magnetic stripe 110, thereby increasing or decreasing the charge separation on the metalized magnetic stripe 110. Additionally, electrostatic charges can be left behind in the magnetic swipe area of the terminal 200 from the previous card swipe. Further, piezoelectric charges from a freshly laminated PVC card 100, which are generally trapped charges, can induce free charges within the metal magnetic stripe 110.

All of these sources for electrical charges (Positive or Negative) can result in discharge of the electrostatic charges into an electrical or electronic device 200, such as a POS terminal 200. The electrostatic discharge from the metalized magnetic stripe 110 to the metal component of the magnetic read head 220 provides a conductive path for such ESD (i.e., electrical current) into various electrical circuits of the POS terminal 200. This can temporarily disable the POS terminal 200 having low tolerance to ESD, requiring re-booting of the terminal 200 or worse, electrical circuits within the terminal can be shorted resulting in terminal failures.

The electrical charge can be stored on the metal or conductive layer 110 due to the capacitance of the conductive layer 110 and the insulator or non-conductive layer 100. The capacitance is defined as the amount of charge q that can be stored on a capacitor for a given voltage. The capacitance (C) is a measure of the amount of charge (q) stored on each plate for a given potential difference or voltage (V) which appears between the plates:

$$C = q/V$$

A capacitor value directly relates to the area of the plate or surface holding the charge. The larger the area of the plate, the more charge can be placed onto that area, thereby increasing the capacitance.

$$C \approx \frac{\epsilon A}{d}; A \gg d^2$$

Where A is the area of the capacitor, d is the separation of the two metallic components of the capacitor and $\in$ is the dielectric constant of any material between the metal components.

The energy stored on a capacitor is related to the size of the capacitance or the square of the charge (Q) stored on the capacitor.

$$E_{stored} = \frac{1}{2}CV^2 \Leftrightarrow E_{stored} = \frac{1}{2}\frac{Q^2}{C}$$

When capacitors are linked in series, the overall capacitance is reduced and the total voltage is divided between the number of capacitors. The total capacitance and charge storage capacity of two capacitors linked in series is less than the capacitance and charge storage capacity of the individual capacitor. That is, the capacitance and the charge storage capacity of the capacitor can be reduced by connecting the capacitor in series with another capacitor.

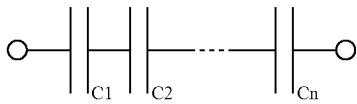

$$\frac{1}{C_{eq}} = \frac{1}{C_1} + \frac{1}{C_2} + \ldots + \frac{1}{C_n}$$

If all of the capacitors are of equal size C then Ceg=C/n.

Accordingly, for example, the present invention utilizes this characteristic of a capacitor to reduce the charge stored on the conductive component 110 of an insulator 100, thereby reducing the energy stored on the conductive component 110. This advantageously reduces the amount of charge and energy discharged into an electronic device 200 when the insulator 100 comprising the conductive component 110 is inserted or comes in contact with the electronic device 200 such that the charge (capacitance) stored on the conductive component 110 discharges to ground or into the electronic device 200. In accordance with an embodiment of the present invention, the overall capacitance of the conductive component 110 can be reduced by dividing the conductive component 110 into many smaller and approximately equally sized sections to provide a discontinuous conductive component. The sections essentially function as multiple capacitors linked in series (e.g., n equal sized capacitors), thereby reducing the overall capacitance of the conductive component 110. The effective capacitance of the conductive component 110 divided into n equal parts linked in series is C/n, where C is the capacitance of the original continuous conductive component 110. This advantageously reduces the overall charge and energy stored on the conductive component 110 by factor of n, thereby greatly reducing the likelihood that ESD from the conductive component 110 of the insulator 100 will damage the electronic component of the electronic device 200.

In accordance with an exemplary embodiment of the present invention, the capacitance of the metalized layer 110 (e.g., a holographic magnetic stripe 120) is reduced by dividing the metalized layer 110 into many pieces (or many capacitors). That is, the metalized layer 110 is divided into many smaller and approximately equally sized capacitors linked in series (e.g., n equal sized capacitors), thereby reducing the overall capacitance of the metalized layer 110. Since the effective capacitance of the metalized layer 110 is now reduced by factor of n, this advantageously reduces the overall charge and energy stored on the metalized layer 110 by a factor of n as well, thereby reducing the level of ESD from the metalized layer 110. Accordingly, by reducing the level of electrostatic charges stored on the metalized layer 110, the present invention enables the insulator 100 comprising the metalized layer 110 to be used on any electronic device 200, even if the electronic device 200 has low tolerance to ESD.

Moreover, since the area of each metalized section is reduced, the capacitance of each non-connected metalized portion is significantly lower than the total capacitance of the metalized layer, thereby lowering the charge storage capacity of the metalized layer 110.

Since a conductor 110 on a non-conducting carrier 100 can hold charge that can damage electronic devices 200 (especially electronic devices with low tolerance to electrostatic discharge), the conducting layer 110 of the present invention is constructed as a discontinuous conductive layer 110 to eliminate or greatly reduce the electrostatic discharge, thereby minimizing or eliminating any potential ESD damage to the electronic device 200. In accordance with an embodiment of the present invention, the conductor 110 on the non-conducting carrier 100 is divided into n-sections of approximately equal or unequal areas that can be used to block or reduce the discharge of the accumulated charges (ESD) from any one or more of the n-sections. It is appreciated that the non-conductive carrier 100 can comprise a plurality of conductors 110, each of which can be divided into different number of sections of approximately equal or unequal areas. Each section can be a line, dot, irregular shaped dots (e.g., birds or corporate logos) or other non-connecting shapes, etc.

Figure 12:
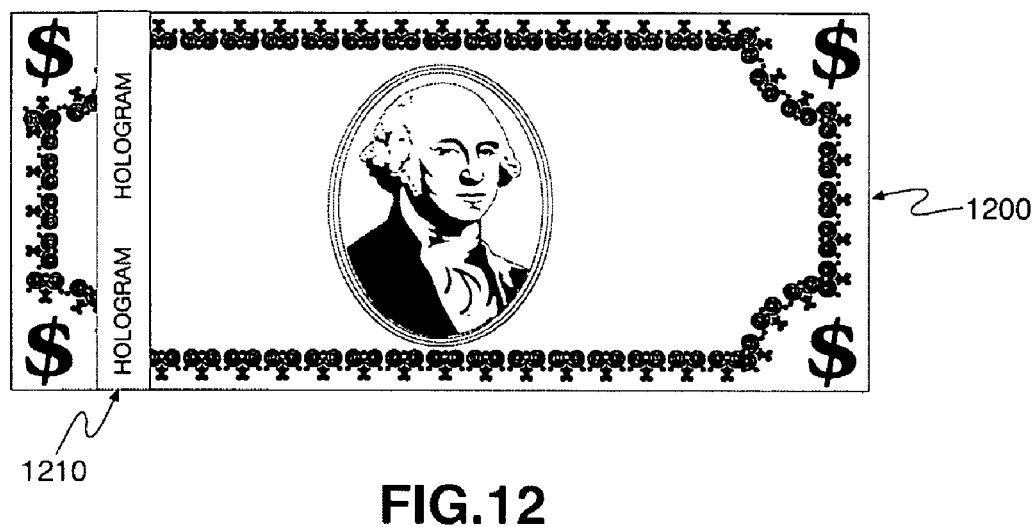
FIGS. 12-13 are diagrams of an exemplary paper or plastic banknote with a metalized holographic thread (or ribbon) and a metalized holographic patch.
Figure 13:
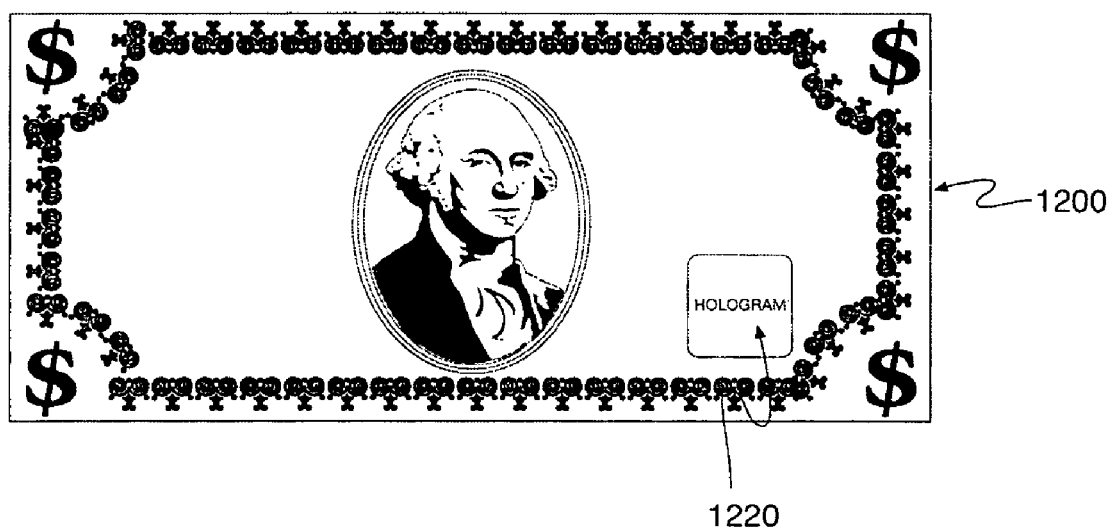

Turning now to FIGS. 12 and 13, a plastic or paper banknote 1200 comprising a metalized holographic thread or ribbon 1210 or a metalized holographic patch 1220 is used herein as an example to illustrate the inventive method of dividing the conductive layer 110 (i.e., the metalized holographic thread 1210) into n-sections. The metal holographic thread 1210 or metalized holographic patch 220 (i.e., the conductive portion of the banknote) on the non-conductive carrier (i.e., the banknote 1200) is divided into n-sections to block or reduce the accumulation of electrostatic charge on the banknote 1200, which can discharge when the banknotes 1200 are counted or processed by an electronic device. By dividing the conductive portion (i.e., the metalized holographic thread 1210 or the metalized holographic patch 1220) of the non-conductive carrier (i.e., the banknote 1200) into n-sections, where each section is isolated from the other sections, the electrical charge carried by the conductive section (i.e., the metalized holographic thread 1210 or the metalized holographic patch 1220) can be blocked from discharging into an electrical device 200 when the conductive portion comes in contact with the electrical device 200. This can occur when the banknotes 1200 are counted or processed by sorting or counting machine.

In accordance with an exemplary embodiment of the present invention, the metalized magnetic stripe 110 (or holographic magnetic stripe 120) on the plastic card 100 is divided into n-sections to block or reduce the accumulation of electrostatic charge on the plastic card 100, which can discharge when the cards comes in contact with the POS terminal 200. In the holographic magnetic stripe 120, the hologram carried on the holographic magnetic stripe 120 is typically made visible by an aluminum metallic layer within the holographic magnetic stripe 120. By dividing the conductive portion (i.e., the aluminum metallic layer of the holographic magnetic stripe 120) of the non-conductive carrier (i.e., the plastic card 100) into n-sections, where each section of the aluminum metallic layer is isolated from the other sections of the aluminum metallic layer, the electrical charge carried by each conductive section can be blocked from discharging into the POS terminal 200 when the card 100 is swiped or inserted into the POS terminal 200. Alternatively, sections can be connected as long as each of the connected sections do not produce ESD events greater than that tolerated by the POS terminal. As noted herein, since the total capacitance of the conductive section is lowered by a factor of n and each conduction section has a lower capacitance, the accumulated charge in each section is not sufficient to discharge (or the ESD is sufficiently low from each conduction section that it is essentially harmless to the electronic device) when the card 100 comes in contact with the POS terminal 200.

Any known method can be used to divide the conductive portion (i.e., the metal layer) 110 of the non-conductive carrier 100 into n-sections to block or reduce ESD. In accordance with an exemplary embodiment of the present invention, the method of reducing the electrostatic discharge comprises laser ablating or engraving lines in the metal or conductive layer 110 (e.g., the aluminum or metal layer (e.g., copper, aluminum/chrome alloys, etc.) in the holographic magnetic stripe 120 or the metalized holographic thread 1210), such that the conductive layer 110 is divided into equal n-sections of x width, e.g., approximately 0.10 inch.

In accordance with an embodiment of the present invention, a laser is used to remove the metal from the metal or conductive layer 110 on a non-conducting carrier 100 by scribing a pattern, such as a vertical line, in the metal layer 110. For example, a laser is used to scribe a vertical line pattern in the metal layer 110, the metal layer of the metalized holographic thread 1210, the aluminum layer of the holographic magnetic stripe 120 or the metalized holographic patch 1220, as shown in FIGS. 5-8 and 10-11, thereby dividing the metal layer into equal n-sections 140 of x width.

To construct a holographic magnetic tape in accordance with an exemplary embodiment of the present invention, aluminum or other metal is added to the holographic tape by evaporating the metal, such as aluminum, copper, aluminum/chrome alloys, etc., onto the polyester backing with a release layer and an embossable layer already on a web. The metalized (or aluminized) web is then passed in front of a laser tuned to the infrared or ultraviolet potion of the spectrum, which burns away the metal (or aluminum) in a line or pattern prescribed by the laser beam or conductive stylus engraving.

As shown in FIGS. 5-8, the placement of the line (or pattern) is set such that the continuous metal (or aluminum, copper, aluminum/chrome alloys, etc.) layer or tape 110 is broken into short sections 140 separated by the laser cut line with no metal (or aluminum, copper, aluminum/chrome alloys, etc.) in the gap 130 between the metal sections 140 of the tape 110. The length x of these metal sections 140 should be small enough so that the overall capacitance of each section 140 is sufficiently low to limit or prevent accumulation electrical charges in each section 140, yet with sufficient brightness.

If the charge q in a section 140 ($q=C \times V$ where C is the capacitance of the section and V is the voltage produced by that charge in that section) is sufficiently low, then the electrostatic discharge into an electronic device 200 is sufficiently small that it does not affect the functionality of that electronic device 200. The maximum length and width (area) of any section 140 is limited by the maximum charge that can be accumulated on the non-conductive carrier 100 (i.e., the PVC card 100) so it can operate with an electronic device 200 having low tolerance to ESD. It is appreciated that the maximum charge is a function of capacitance, tribocharging, humidity and surface conditions of the non-conductive carrier 100.

Figure 5A:
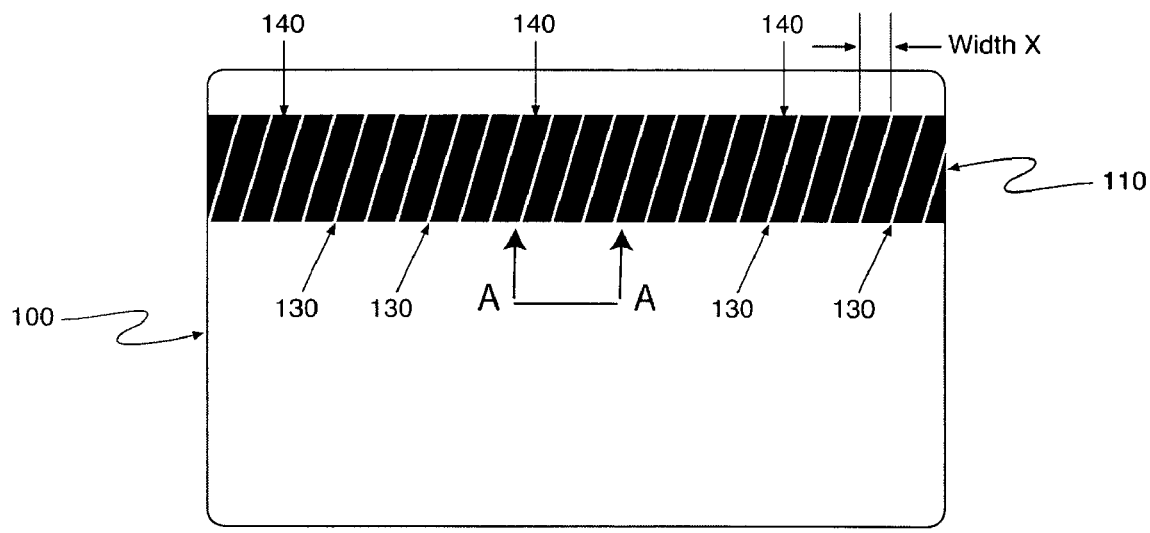
FIGS. 5A-B are schematic diagrams illustrating the exemplary conductive layer being divided into sections in accordance with exemplary embodiment of the present invention.
Figure 5B:
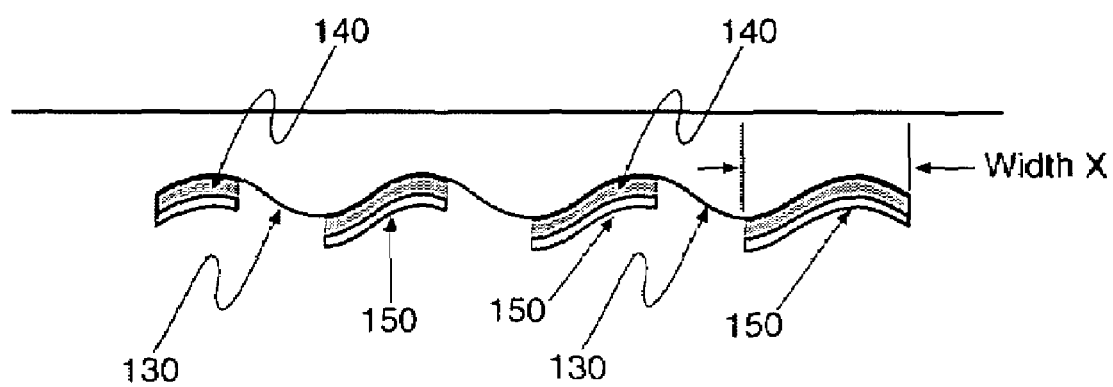
Figure 6A:
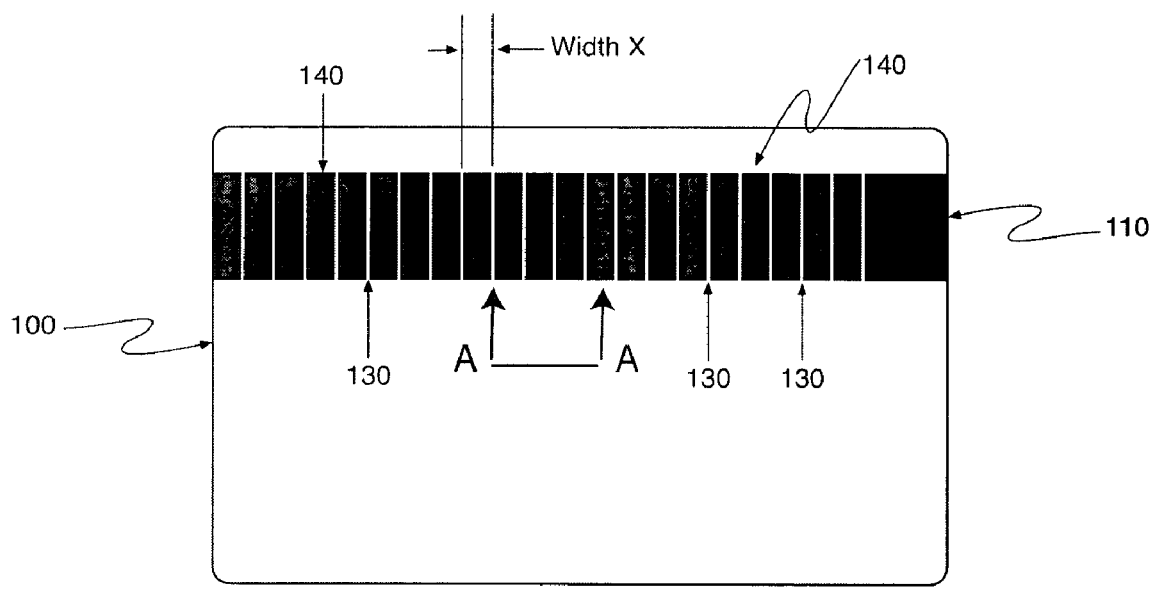
FIG. 6A-B are schematic diagrams illustrating the process of dividing the exemplary conductive layer into sections in accordance with an exemplary embodiment of the present invention.
Figure 6B:
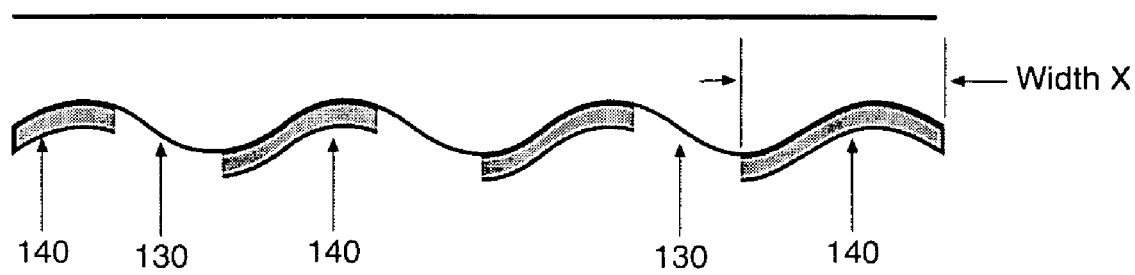
Figure 8:
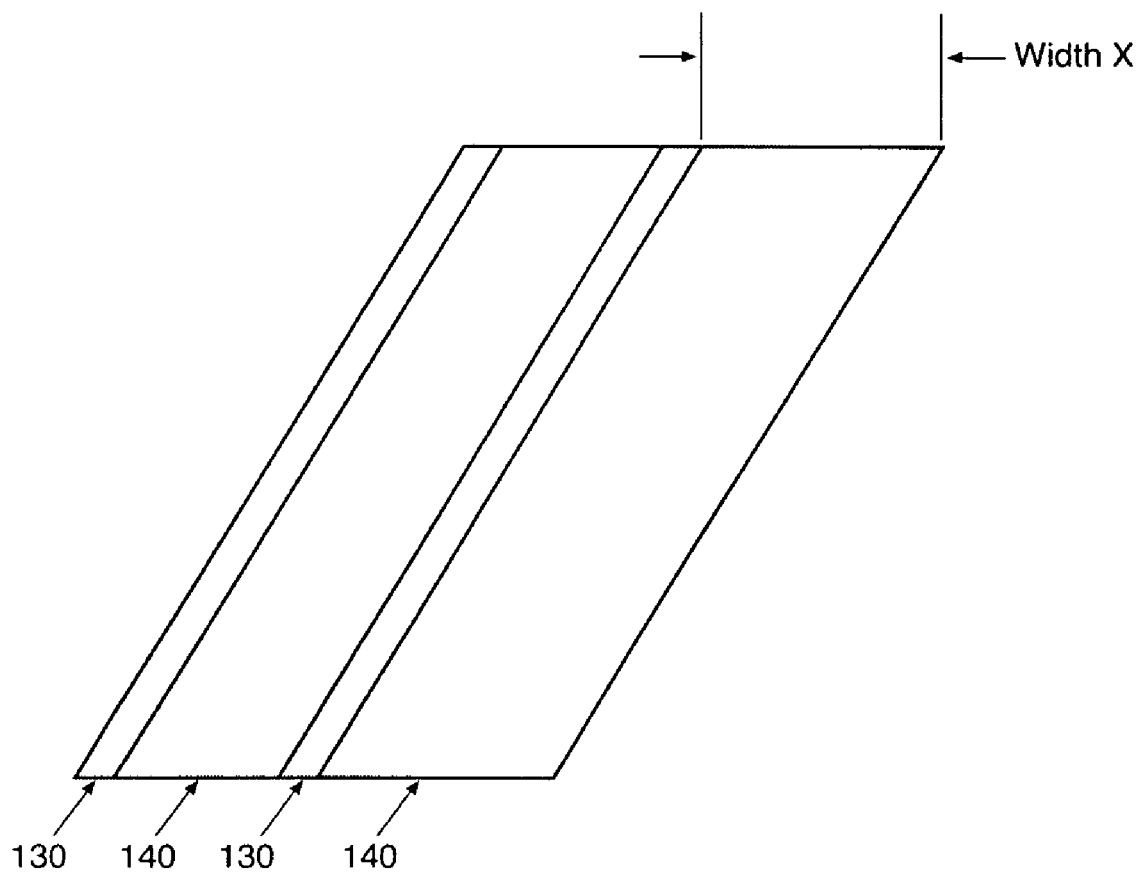
FIG. 8 is a schematic diagram illustrating the exemplary conductive layer being divided into two sections in accordance with exemplary embodiment of the present invention.

The laser engraved pattern can comprise vertical lines that are perpendicular to the length of the metal tape 110 as shown in FIG. 5A or at an angle to the metal tape direction as shown in FIGS. 5B and 8. It is appreciated that the spacing of the laser engraved line or gap 130 between the sections of the conductive aluminum or metal tape 110 must be wide enough to suppress the ability of the electrical charges, driven by the voltage, to jump the gap 130 and continue to conduct down the metal tape 110 and into the electronic device 200 that comes in contact with the metal tape 110. Therefore, the size of the metal section 140 and the width of the gap 130 can be adjusted to suit a particular design. For example, these two parameters can be adjusted to provide a holographic pattern with the smallest metal sections 140 (e.g., at least approximately 0.10 inch in width) but with sufficient brightness to provide adequate viewing of the hologram.

In accordance with an embodiment of the present invention, sections of the metal tape or layer 110 are removed by chemically etching away sections of the metal (i.e., aluminum, copper, aluminum/chrome alloys, etc.) using an acid etch or a caustic wash solution (i.e., a demetalization process), as shown in FIGS. 6B, 8 and 9A-B. The areas of the metal tape 110 not to be removed are protected by a chemical resist coating 150 FIG. 5b that can be printed onto the metal tape 110 with a gravure cylinder or other applicable printing method. The gravure cylinder is etched in a pattern to be used to protect the aluminum (i.e., metal) on the web of construction that comprises the aluminum layer.

Figure 9A:
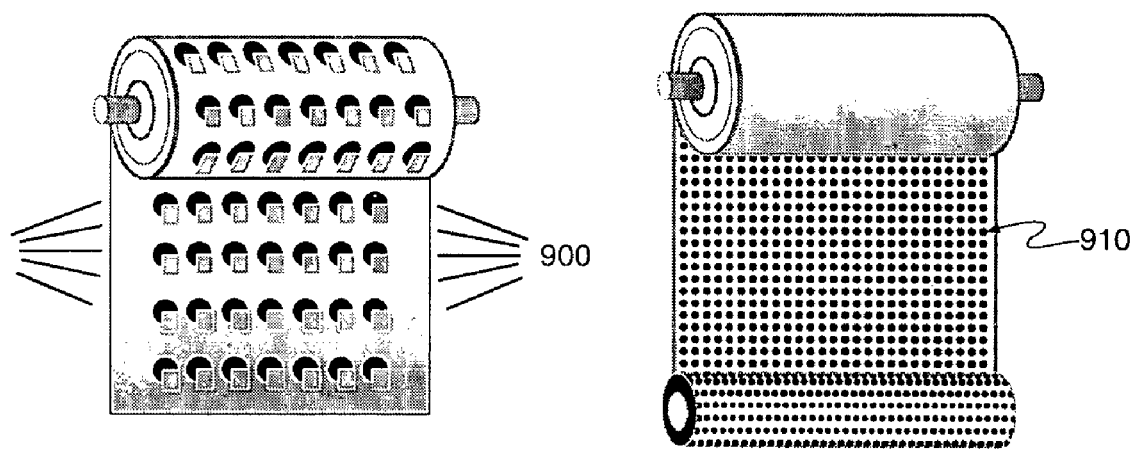
FIGS. 9A-B are schematic diagrams showing the demetalization process for dividing the conductive layer into sections in accordance with an exemplary embodiment of the present invention.
Figure 9B:
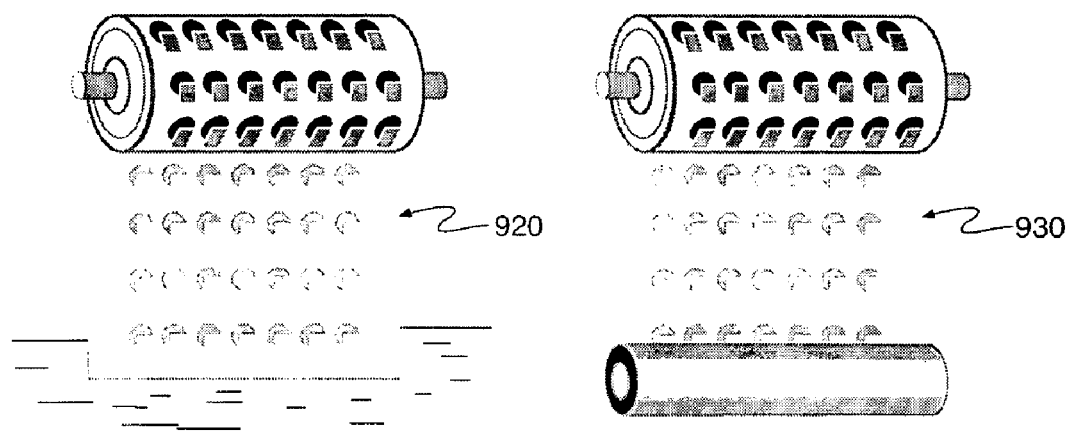

As shown in FIGS. 9A-9B, the demetalization process is used in accordance with an exemplary embodiment of the present invention to generate a discontinuous conductive layer (i.e., holographic metal layer) by selectively removing the metal (i.e., aluminum) from the holographic layer in a specified pattern. A roll of the holographic embossed image is metalized with aluminum in step 900. A gravure cylinder (or other comparable printing method) prints chemical resist pattern (i.e., a dot or other geometric shape resist pattern) on the roll aluminized film for selectively protecting and retaining the aluminum sections on the web from the caustic wash in step 910. The gravure cylinder prints the chemical resist in those areas of the aluminized film where the aluminum is to be kept and does not print any chemical resist in those areas where the aluminum is to be removed. The roll of aluminized film or web printed with the chemical resist pattern by the gravure cylinder is then passed through an aluminum removing chemical bath (e.g., sodium hydroxide) or an acid wash which etches away the aluminum in those areas where there is no chemical resist and leaves the aluminum that is protected by the chemical resist in step 920.

Figure 7:
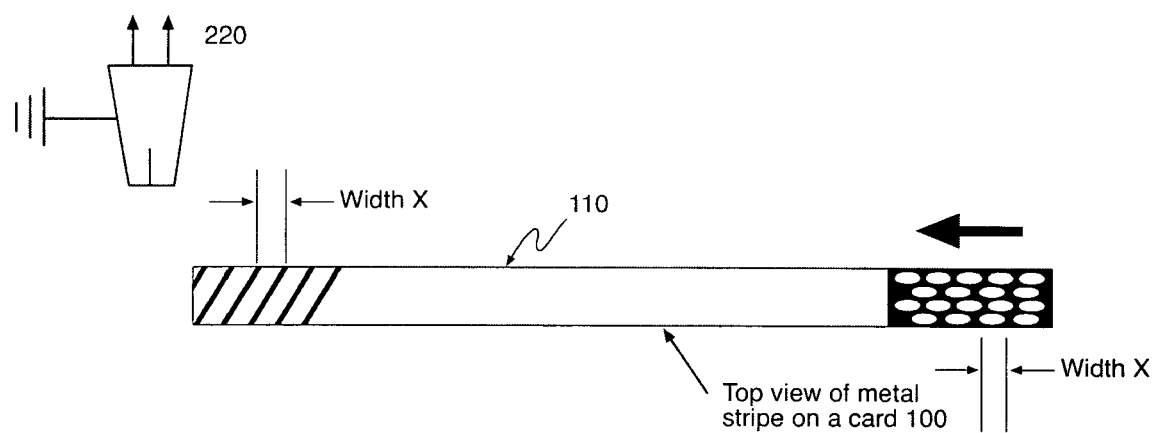
FIG. 7 is a schematic diagram illustrating the reduction or elimination of the electrostatic discharge from the exemplary conductive layer by dividing the exemplary conductive layer into two examples of the metal reduced sections (the line pattern on the left and the dot pattern on the right) in accordance with an exemplary embodiment of the present invention.
Figure 10:
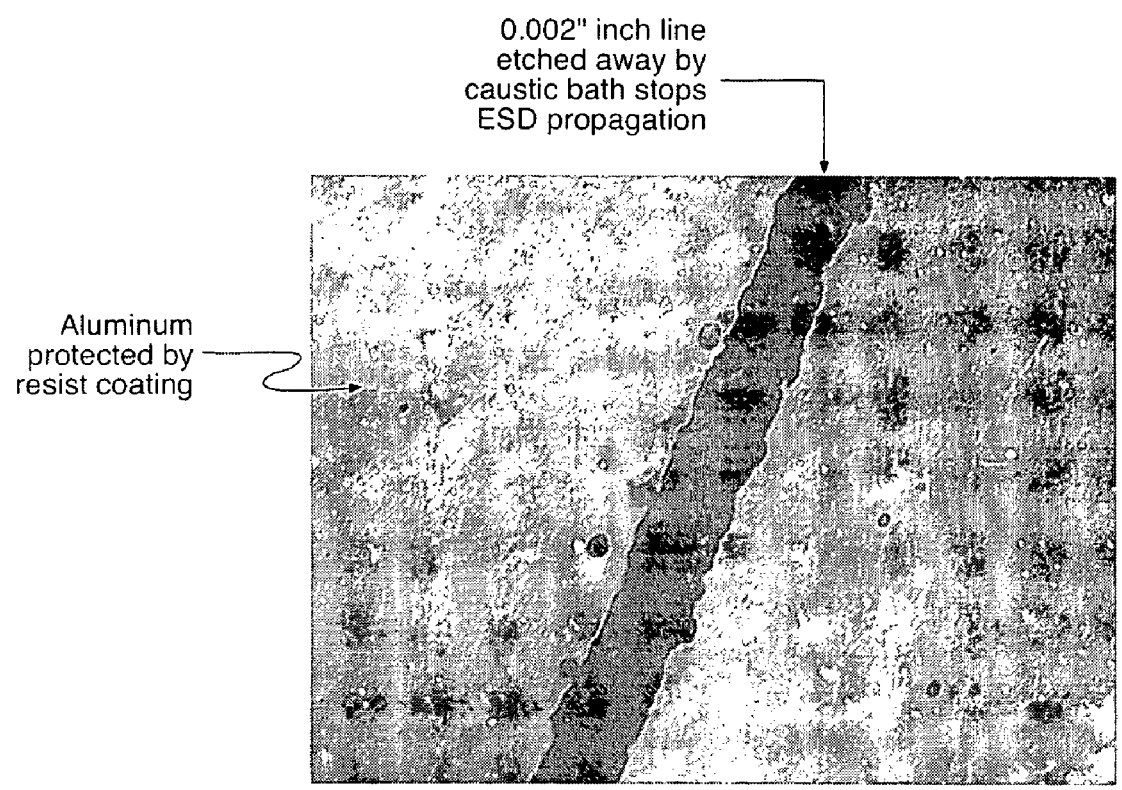
FIG. 10 is diagram showing a line demetalization of a metalized film in accordance with an exemplary embodiment of the present invention.
Figure 11:
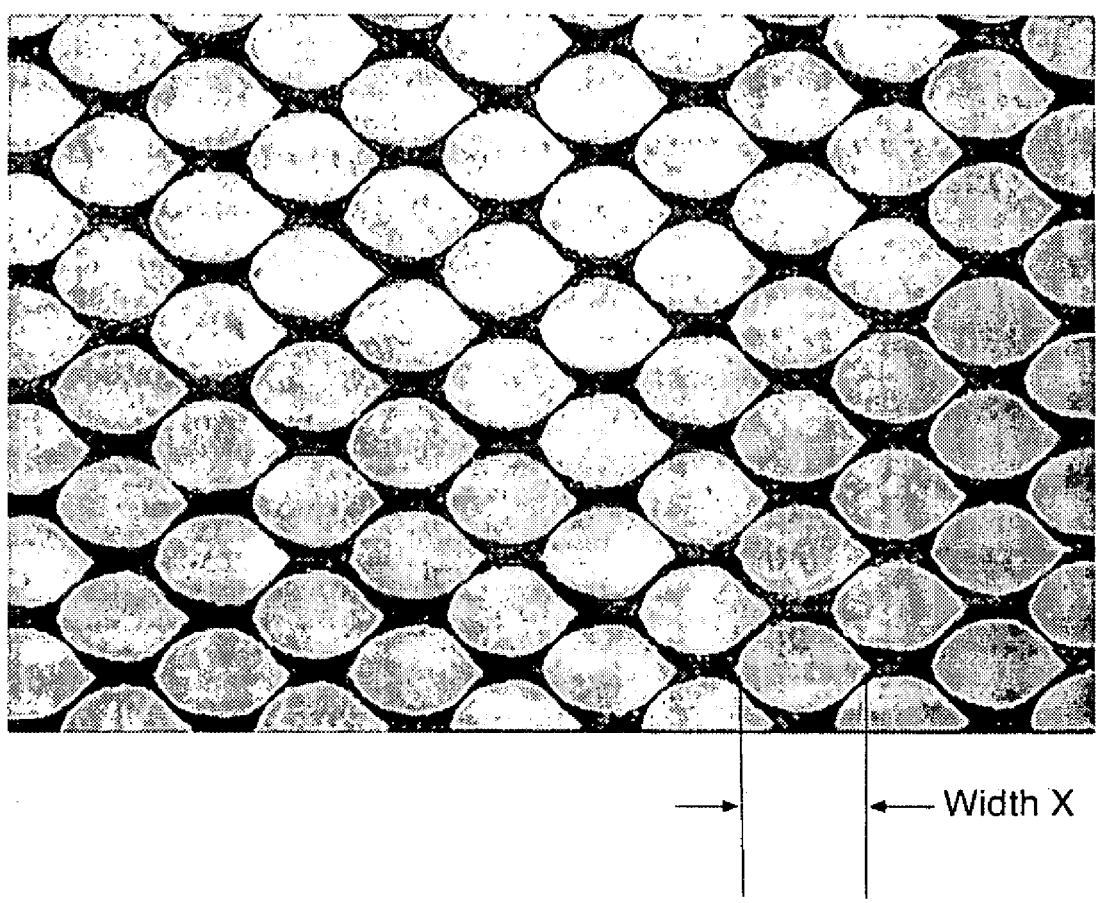
FIG. 11 is a diagram showing a magnified dot pattern demetalization of a metalized film in accordance with an exemplary embodiment of the present invention.

The caustic chemical solution is washed off the demetalized web in step 930. The magnetic and other coatings are then applied to the demetalized web. An example of the line demetalization of the aluminized film is shown in FIGS. 7 and 10 and an example of the dot pattern demetalization process is shown in FIGS. 7 and 11. The line patterns shown in FIG. 7 comprise parallel lines or sections of aluminum of a specific spacing and width. The dot pattern shown in FIG. 7 comprises dots of various shapes such as elliptical or circular shapes. The bright areas represents the aluminum islands or sections 140 of the metal layer and the dark areas represents the gaps 130, where the aluminum has been removed by the caustic chemical bath after the aluminum islands have been protected by the selectively applied chemical resist.

It is appreciated that although the demetalization process described herein involves the use of caustic wash after the application of a caustic resist mask, other known demetalization or other techniques can be utilized in the present invention to generate a fragmented or discontinuous conductive layer or surface. In accordance with an exemplary embodiment of the present invention, the fragmented conductive layer can be generated using a demetalization process, which applies an etching agent directly onto the metalized or conductive surface followed by a rinse with a washing solution. Alternatively, in accordance with an exemplary embodiment of the present invention, the fragmented conductive layer can be generated by applying a water soluble material to the un-metalized holographic surface, metalizing the holographic surface and treating the metalized holographic surface with a wash to dissolve the water soluble material and the covering metal.

The demetalization process of the present invention is used to generate a discontinuous aluminum or other metal layer such that the conductivity and capacitance of the metal layer is significantly changed. The ESD energy/charge stored in each isolated section 140 of the aluminum layer is much less than the continuous metal layer. The separation of each section 140 (or an aluminum island) increases the electrical resistance, thereby making it difficult for the accumulated charge in a section 130 to discharge into an electronic device 200.

The demetalization process should be carefully controlled so that there is no metal remaining in the gap 130 between the metal sections 140. This may require sufficient application of the caustic wash that etches the aluminum away between the resist patterns. Any metal material left in the gap 130 between the metal sections 140 can bridge the metal sections 140, thereby providing conductive paths sufficient to produce ESD into the electronic device 200. However, if the caustic wash is too aggressively applied, it can breakdown the metal area protected by the resist pattern and reduce the aluminum areas (or the metal sections 140) that are meant to be kept. This will decrease the brightness and image quality of the holographic image.

In accordance with an exemplary embodiment of the present invention, the method generates a discontinuous metal layer by generating a demetalized (or selectively metalized) dot pattern (e.g., "Halftone Pattern") with a sufficiently high dot density to reconstruct the holographic image but not high enough to cause the halftone dots from "connecting". That is, the dot density is sufficiently low to prevent the halftone dots from "connecting" as shown in FIG. 11. For example, the holographic image can be reconstructed without causing the halftone dots from connecting when the dot density, i.e., the percentage of coverage of metal "dots" relative to the total area of the conductive component was greater than 50%. For certain applications, the dot density or coverage can or should be greater than 70% to increase the brightness of the holographic image. In accordance with an embodiment of the present invention, the halftone dot pattern techniques are used to generate a discontinuous metal layer with the highest dot density without connecting dots.

The process of generating a discontinuous metal layer by selectively removing sections of metal from the metal layer of the holographic tape reduces or blocks the ESD from reaching the sensitive components of the electronic device, such as the magnetic read head, by decreasing the capacitance, the amount of charge that can be stored on any one or more aluminum section and increasing the resistance of the metal layer.

In accordance with an embodiment of the present invention, a discontinuous metal layer 110 can be generated by selectively applying discontinuous metal pattern on the non-conducting carrier or substrate 100. The discontinuous metal pattern can comprise discrete metal sections of limited area to prevent or minimize the accumulation of charge in a given area. Each section 140 is separated from an adjacent section by a sufficient distance so that the accumulated charge in one section 140 cannot arc across the gap 130 to another section 140.

The present invention generates a discontinuous metal layer 110 (i.e., small isolated areas of metal) on a non-conducting substrate 100 by selectively removing metals from a continuous metal layer 110 on the non-conducting carrier 100 or by selectively applying the metal on the non-conducting carrier 100. Various metal removing, metal printing or deposition techniques can be utilized in the present invention to generate small areas of metal that are sufficiently isolated from one another (i.e., a discontinuous metal layer) to block ESD into any electronic device 200, including those with low tolerance to ESD.

In accordance with an embodiment of the present invention, the metal removal and metal addition methods into fixed patterns should satisfy the two criteria: a) minimum accumulation of charge (i.e., minimum area of metal coverage consistent with brightness of image carried by the metal area) and b) prevention of the metal sections 140 from connecting to one another so that the charge accumulated on each section 140, by various methods, cannot discharge in combination with other metal sections 140 to generate an ESD of damaging current or voltage to an electronic device 200.

It is appreciated that the actual path of charge migration to the point of discharge is mediated by the presence of the embedded conductive layer 110, the electrical resistance is determined by the integrity of the metal layer 110. The resistance of the metal layer 110 depends on the fragmentation of the metal. The electrical resistance of the metal layer 110 increases with the metal fragmentation (i.e., a discontinuous metal pattern), which reduces the propagation of the accumulated charge on the conductive layer 110. Turning now to FIGS. 1 and 4, where the accumulated charges propagate from right to left across the width of the metalized stripe 110 along the leading vertical (top) edge of the card 100, the present invention can employ any mechanism that induces a break-up of this conductive path to prevent electrostatic discharge from occurring along any exposed edges of the magnetic stripe or from the body of the magnetic stripe.

In accordance with an exemplary embodiment of present invention, deeply etched diffractive elements, strategically embodied within the holographic image, are employed with mechanical embossing, the concomitant deformation and fragmentation of typical holographic pre-metalized foils to disrupt the metal layer 110 or the conductive path. This purposeful microscopic disruptions in the metal layer 110 effectively impede charge propagation, thereby reducing or preventing electrostatic discharge from occurring along any exposed edges of the non-conductive carrier 100.

The present invention has application in any non-conductive carrier having a conductive component that interfaces with an electronic device, human subject or object. Anywhere that a combination of a conductive portion or element is on or in a non-conducting carrier, the conductive element can potentially retain electrostatic charge and discharge that accumulated charge into an electronic device when the carrier and conductor combination interfaces with the electronic device. In accordance with an embodiment of the present invention, fragmenting or dividing the conductive portion into smaller sections reduces the charge accumulated on each area and isolating these sections blocks any potential discharge of the accumulated charge into the electronic device. The following is an illustrative example of various applications of the present invention:

A metalized magnetic tape by itself can carry a metal layer and a non-conducting carrier such as a polyester backing which could develop ESD when used in conjunction with a tape read/write device without having the metalized tape mounted or attached to a secondary non-conducting carrier. The metalized portion of the tape when divided by the processes described in this embodiment of the present invention would prevent ESD build up and discharge into any device, human or system when using or handling the metalized tape on the non-conducting tape backing.

The metalized holographic thread 1210 or metalized holographic patch 1220 on paper or plastic banknotes 1200 can carry a charge that potentially can discharge into a banknote acceptor. In accordance with an exemplary embodiment the present invention, the metal layer of the holographic ribbon 1210 or the holographic patch 1220 can be fragmented or divided into small isolated metal sections to reduce or eliminate any potential ESD into a banknote acceptor while maintaining the visual appearance of the holographic ribbon 1210 or the holographic patch 1220.

Holograms on plastic cards that are not part of the magnetic stripe are typically used for visual security and design on many payment cards. If the metal layer in the hologram is of sufficient size and location, it can also accumulate a charge from the triboelectric charge generation and potentially discharge into a POS terminal through the magnetic read head, a ground path, or the chip reader. In accordance with an exemplary embodiment of the present invention, the metal layer in the hologram can be fragmented or divided into sections to reduce or minimize any potential ESD into the POS terminal.

Metal batteries in plastic cards are used to provide power for RF-ID cards and displays. In accordance with an exemplary embodiment of the present invention, the surface of the battery can be fragmented or divided into smaller metal sections to reduce or minimize any potential ESD into the reader.

The contact pads on smart cards are metallic and interfaces (i.e., contacts) with the read circuits of the smart card reader. In accordance with an exemplary embodiment of the present invention, the contact pads are fragmented or divided into smaller metallic sections to minimize or reduce any potential ESD into the smart card reader while still maintaining the electrical contact of the large pin connector that communicates with the chip in the card.

Further, there are many other applications where it may be advantageous to reduce or eliminate any potential ESD from a device to another device or a person. For example, metal surgical instruments in a high oxygen atmosphere can benefit from a metallic surface over an insulator that has been divided into many smaller low capacitance sections. A pace maker in a human heart can benefit from being enclosed in a metal case that has a surface fragmented into small metallic sections to reduce any potential harm from electromagnetic induction or ESD.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, and composition of matter, means, methods and steps described herein. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A plastic card comprising:
    a plastic non-conductive carrier and
    a holographic magnetic stripe on the plastic non-conductive carrier;
    wherein the holographic magnetic stripe comprises a magnetic layer, an embossed layer with a holographic pattern embossed therein for providing a holographic image, and a conductive layer formed of a reflective metal on the holographic pattern and conforming thereto for enhancing visibility of the holographic image; and,
    wherein the conductive layer comprises a plurality of conductive sections electrically isolated from one another by gaps for disrupting a conductive path for triboelectric charges so that a triboelectric charge accumulated in one section does not combine with a triboelectric charge accumulated in another section when the card is swiped through or inserted into a magnetic reader.

2. A plastic card of claim 1, wherein areas of said conductive sections are limited by a predefined value of maximum charge that can be accumulated thereon.

3. A plastic card defined in claim 1, wherein the conductive sections form a selectively metalized dot pattern.

4. A plastic card defined in claim 3, wherein the conductive sections form a dot pattern having a dot density of greater than 50% and wherein dots within the dot pattern are not connected to one another and are electrically isolated from one another.

5. A plastic card defined in claim 3, wherein said conductive sections form a dot pattern having a dot density of greater than 70%.

6. A plastic card defined in claim 1, wherein the gaps are laser engraved lines.

7. A plastic card defined in claim 1, wherein the magnetic stripe is a metalized magnetic stripe.

8. A plastic card defined in claim 1, wherein the gaps are demetallized lines.

9. A plastic card defined in claim 1, wherein the conductive sections form a demetallized pattern of separated dots.

10. A plastic card defined in claim 1, wherein the conductive sections have approximately equal areas.

11. A plastic card defined in claim 1, wherein the conductive sections have a width of at least approximately 0.10 inch.

12. A plastic card defined in claim 1, wherein the gaps are formed by chemical etching.

13. A plastic card defined in claim 1, wherein the conductive sections form a pattern of separated dots.

14. A holographic magnetic stripe for attaching to a plastic card, comprising:
    a reflective hologram comprising: an embossed layer with a holographic pattern embossed therein for providing a holographic image, and a metallic coating on the holographic pattern and conforming thereto for enhancing visibility of the holographic image, and a magnetic coating supported by the reflective hologram,
    wherein the metallic coating comprises a plurality of conductive sections electrically isolated from one another by gaps for disrupting a conductive path for triboelectric charges so that a triboelectric charge accumulated in one section does not combine with a triboelectric charge accumulated in another section when the plastic card with is swiped through or inserted into a magnetic reader.

15. A holographic magnetic stripe defined in claim 14, wherein the conductive sections form a dot pattern having a dot density of greater than 50% and wherein dots within the dot pattern are not connected to one another and are electrically isolated from one another.

16. A holographic magnetic stripe defined in claim 14, wherein the gaps are laser engraved lines.

17. A holographic magnetic stripe defined in claim 14, wherein the conductive sections have approximately equal areas.

18. A holographic magnetic stripe defined in claim 14, wherein the conductive sections have a width of at least approximately 0.10 inch.

19. A holographic magnetic stripe defined in claim 14, wherein the gaps are formed by chemical etching of the metallic coating.

20. A holographic magnetic stripe defined in claim 14, wherein the reflective hologram is releasably supported by a plastic web.

21. A holographic magnetic stripe defined in claim 14, wherein the conductive sections form a pattern of separated dots.

\* \* \* \* \*